May 28, 1940. W. B. FOULKE 2,202,418
CLASSIFICATION SYSTEM
Filed Aug. 11, 1938
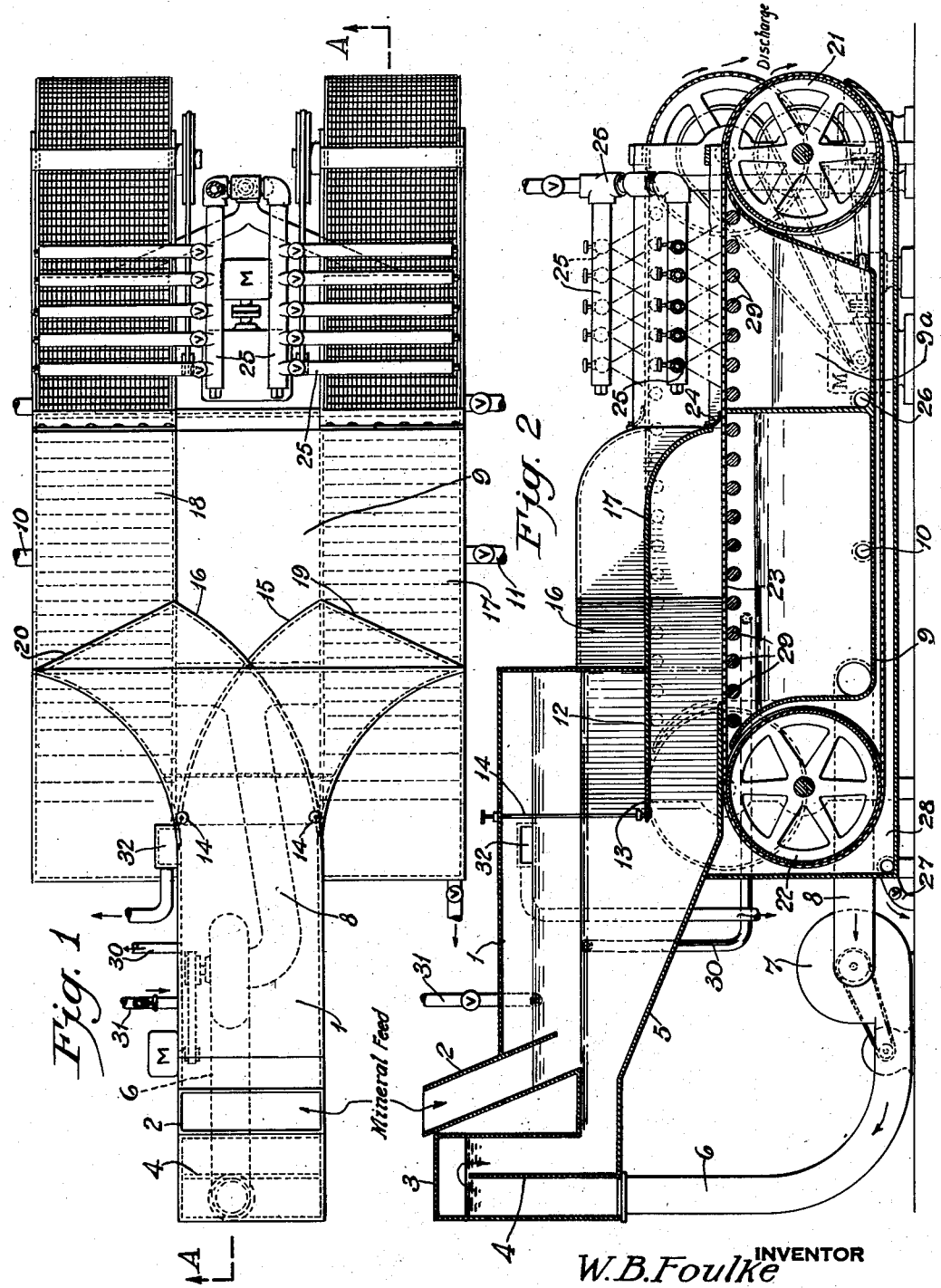
W.B.Foulke INVENTOR
BY
John L. Seymour
ATTORNEY Patented May 28, 1940

2,202,418

UNITED STATES PATENT OFFICE 2,202,418

CLASSIFICATION SYSTEM

Willing B. Foulke, Media, Pa., assignor, by mesne assignments, to Delaware Chemical Engineering and Development Company, Wilmington, Del., a corporation of Delaware Application August 11, 1938, Serial No. 224,252

4 Claims. (Cl. 209—173)

This invention relates to apparatus for separating solids of different specific gravities by means of a parting liquid having intermediate specific gravity. The apparatus finds particular use in the separation of minerals from indigenous impurities. For convenience the apparatus will be described in connection with the separation of coal from slate, but the said description is illustrative, not limiting.

Figure 1 is a plan view of my apparatus; Figure 2 is a vertical section on line A—A of Figure 1.

Referring to the numerals on the drawing, 1 is an enclosed channel; 2 is a chute for delivering mixed coal and slate to the channel; 3 is a weir box above the channel; 4 is the weir in the weir box; 5 is an inclined bottom forming a part of the said channel; 6 is a pipe supplying liquid to said weir box; 7 is a pump for supplying liquid to the pipe; 8 is a pipe connecting the pump with tank 9; 10 is a pipe for supplying liquid to tank 9 as needed; 11 is a pipe for draining tank 9; 12 is a plate dividing the channel into upper and lower parts; 13 is a hinged lip on, and forming a continuation of, said plate; 14—14 are hand screws attached to said hinged plate and threaded into the top of the tank 1 so that the lip 13 may be adjusted vertically; 15 is an enclosed channel through which the liquids below the said dividing plate are conducted; 16 is a channel through which the liquids above the said dividing plate are conducted. It will be observed that the bottom of the channel, the sides of the channel, and the edge of lip 13 form an orifice through which the lower liquids find their way into channel 15, and that the top of channel 16 together with the sides of the channel and the plate 12 form an orifice leading to channel 16. Channel 15 discharges into channel 17 and channel 16 discharges into channel 18. The floor 5 of channel 1 ends at 19 and the floor 12 of the upper channel ends at 20. 21—22 are drums beyond the tanks 9 and 9—a operated by a motor M; 23 is a wire belt of the Fourdrinier type offering a restricted escape to the liquids which come from the channel 15; 24 is a flexible flap between the end of the top of channel 17 and the surface of the wire; 25 is a system of sprays for spraying the solids which are carried out of the channel on the wire; 9—a is a tank separated from tank 9 for receiving the washings; 26 is a drain for the said tank; 27 is a drain for the tank-like pan 28 which is beneath the entire apparatus; 29 are rollers supporting the Fourdrinier wire and acting to drain the liquids therefrom. The construction of the channel 18 is similar.

The device operates as follows: The pump is started and forces a supply of liquid into the weir box whose construction ensures the delivery of an equal flow of the liquid through the channel at a uniform head. The capacity of the tank 9 and the pump 7 is greater than the capacity of openings through the screens to the lower tanks so that the liquid fills the tank above partition 10 plate 12. The principle is, that the capacity of the fluid delivery system is greater than that of the discharge orifices, but not as great as the capacity of the discharge orifices plus the upper orifice. However, a fluid delivery of greater capacity can be provided if desired if an overflow 30 is provided in the side of the channel to prevent the level of the upper liquid from covering the upper orifice. Water is admitted to the tank through pipe 31 and an overflow 32 is provided to maintain it at constant level. The solids are fed through the chute to the moving stream of liquid; the particles heavier than the parting liquid go with the stream below the partition 12 and the particles lighter go into the upper orifice. After they have passed the orifice 13, the liquids are bled away by the Fourdrinier wire at a rate faster than the influx of the liquid through the orifice so that, as the wire approaches the flap 24, all excess liquid has passed through to the tank 9. The solids are then carried beneath the sprays 25. At the same time the floating materials are carried through the channel 16 to the channel 18 and its Fourdrinier wire and are similarly treated. Both wires and their solids are thoroughly sprayed as they emerge and the wash liquid is caught in the tank 9—a.

The nature of the parting liquid process may be learned by consulting a copending application of Alexander, du Pont and Foulke.

There may be more than two channels provided in the manner set forth in my copending case Serial No. 140,590.

A great advantage of the invention is the means and method of separating the liquids from the solids, consumption of power being low and recovery of parting liquid being highly simplified.

As many apparently widely different embodiments of the invention may be made without departing from the spirit and scope thereof, it is to be understood that I do not limit myself to the specific embodiments thereof except as defined in the appended claims.

I claim:

1. The apparatus for classifying solids which comprises a single channel to receive solids of mixed gravities and a stream of parting liquid having a specific gravity between those of the mixed solids, means for introducing solids of mixed gravities into said stream of parting liquid, a plurality of channels connecting with said single channel by a plurality of orifices to receive upper and lower parts of said stream, at least one of said channels having a bottom comprising a Fourdrinier belt, means to circulate the said liquid through said channels including a liquid supply comprising a tank beneath the Fourdrinier wire and a pump having a capacity greater than the capacity of the lowest of said orifices, means to prevent the stream delivered to said orifices from exceeding their combined capacity, and means to wash the solids on the wire after the escape of the parting liquids.

2. The apparatus for classifying solids which comprises a single channel to receive solids of mixed gravities and a stream of parting liquid having a specific gravity between those of the mixed solids, means for introducing solids of mixed gravities into said stream of parting liquid, a plurality of channels connecting with said single channel by a plurality of orifices to receive upper and lower parts of said stream, at least one of said channels having a bottom comprising a Fourdrinier belt, means to circulate the said liquid through said channels including a liquid supply comprising a tank beneath the Fourdrinier wire and a pump having a capacity greater than the capacity of the lowest of said orifices, and means to prevent the stream delivered to said orifices from exceeding their combined capacity.

3. The apparatus for classifying solids comprising a single channel to receive solids of mixed gravities and a stream of parting liquid, means for introducing solids of mixed gravities into said stream of parting liquid, a plurality of channels connecting with said single channel by a plurality of orifices to receive upper and lower parts of the said stream, at least one of said channels having a bottom comprising a Fourdrinier belt, and means to circulate the said liquid through said channel having a capacity greater than the capacity of the lowest orifices but not greater than the combined capacity of all said orifices.

4. The apparatus for classifying solids which comprises a single channel to receive solids of mixed gravities and a stream of parting liquid, means for introducing solids of mixed gravities to be classified into said stream of parting liquid, a plurality of vertical spaced channels connected with said first-named channel and dividing the stream, by a plurality of orifices to receive upper and lower parts of the said stream, at least one of said channels having a bottom comprising a Fourdrinier belt, and means to circulate said parting liquid through said single channel, through said plurality of orifices, and thence through said last-named plurality of connecting channels.

WILLING B. FOULKE.